United States Patent [19]
Nannichi et al.

[11] Patent Number: 5,280,365
[45] Date of Patent: Jan. 18, 1994

[54] IMAGE PROCESSOR WITH REDUCTION OF ENLARGED IMAGE DATA TO FORM IMAGE DATA ENLARGED WITH A DESIRED MAGNIFICATION

[75] Inventors: Toshihiko Nannichi, Fuchu; Masayoshi Aihara, Hino, both of Japan

[73] Assignee: Kabushiki Kaisha Toshiba, Kawasaki, Japan

[21] Appl. No.: 907,247

[22] Filed: Jul. 1, 1992

[30] Foreign Application Priority Data

Jul. 2, 1991 [JP] Japan .................................. 3-161888
Jul. 2, 1991 [JP] Japan .................................. 3-161889

[51] Int. Cl.$^5$ .............................................. H04N 1/393
[52] U.S. Cl. ........................................ 358/451; 358/445
[58] Field of Search ................... 358/451, 445, 448; 382/47; 395/102

[56] References Cited

U.S. PATENT DOCUMENTS

| | | | |
|---|---|---|---|
| 4,282,550 | 8/1981 | Coviello | 358/451 |
| 4,734,785 | 3/1988 | Takei et al. | 358/451 |
| 4,851,922 | 7/1989 | Takayama et al. | 358/451 |
| 5,214,519 | 5/1993 | Faulhaber | 358/451 |

*Primary Examiner*—Edward L. Coles, Sr.
*Assistant Examiner*—Scott A. Rogers
*Attorney, Agent, or Firm*—Finnegan, Henderson, Fababow, Garrett & Dunner

[57] ABSTRACT

An image processor in which input image data is sampled at a sampling circuit at a constant rate corresponding to P times the rate of the input image data and then subjected at a decimating circuit 14 to a decimating/reducing operation with a magnification of 1/Q to obtain image data having a magnification of P/Q in a horizontal scanning direction. An original-document reading motor is controlled under a scanner controller so that a relative moving speed between an image and a CCD is set to be lower than an ordinary moving rate. Under this condition, the image is repetitively read a plurality of times with respect to an identical line and then subjected at a line decimating circuit to a decimating/reducing operation on every line basis to obtain a resultant image having a desired magnification in a vertical scanning direction.

13 Claims, 14 Drawing Sheets

IMAGE PROCESSOR WITH REDUCTION OF ENLARGED IMAGE DATA TO FORM IMAGE DATA ENLARGED WITH A DESIRED MAGNIFICATION

BACKGROUND OF THE INVENTION

1. Field of the Invention

The present invention relates to image processors which process input image data to obtain a resultant image having a desired magnification(s) in a horizontal and/or vertical scanning direction(s) with respect to an original image and more particularly, to an image processor in which input image data is enlarged with a predetermined magnification(s) in a horizontal and/or vertical scanning direction(s) and thereafter the image data is reduced, whereby the need for provision of a memory for speed conversion can be eliminated with its simplified and small-scaled arrangement.

2. Description of the Related Art

In general, as an image processor which processes input image data to obtain an image having a desired magnification(s) in a horizontal and/or vertical scanning direction(s) with respect to an original image, there is known an image processor which performs interpolating operation over input pixel data to realize an image enlarged in the horizontal scanning direction or which performs interpolating operation over input line data to realize an image enlarged in the vertical scanning direction.

Further, when it is desired to read a two-dimensional image with use of a one-dimensional reading sensor, such a method is generally employed that a relative position between the one-dimensional reading sensor and the image is moved in a direction (vertical scanning direction) perpendicular to the one-dimensional reading sensor and an original document to perform raster scanning operation.

With such a document stationary type image processor (which is also known as a flat bed scanner or a book reading scanner), for the purpose of avoiding its feeding irregularity, the one-dimensional reading sensor is moved at a constant speed in the direction perpendicular to the original document to realize raster scanning operation.

FIG. 11 shows a prior art image processor which performs interpolating operation over pixel data of input image data to obtain an output image corresponding to an original image but enlarged in a horizontal scanning direction. In the image processor of FIG. 11, an original image is raster scanned through a charge coupled device (CCD) 11 as a one-dimensional reading sensor to obtain an image, the image signal is converted at an analog-digital (A-D) converter 12 into digital image data that comprises continual n-bit pixel data for respective pixels, the digital image data is once input to a memory 15 for speed conversion, the image data stored in the memory 15 is read out under control of an interpolating circuit 16, and the read-out image data is subjected to an interpolating operation of inserting predetermined pixel data to thereby obtain image data enlarged in the horizontal scanning direction (raster direction).

In this case, the interpolated pixel data is determined by referring to pixel data therearound to be interpolated. For example, the pixel data indicative of the previous pixel read out from the memory 15 is used as interpolation pixel data as it is.

FIG. 12 shows a relationship between the output image data of the A-D converter 12 and the output image data of the interpolating circuit 16 in the prior art image processor of FIG. 11. In more detail, the A-D converter 12 sequentially outputs n-bit pixel data PD1, PD2, PD3, PD4, ... corresponding to continual pixels as shown in Part (a) of FIG. 12. When it is desired to doubly enlarge the image date at a position of the pixel data PD2, the same pixel data PD2' as the pixel data PD2 is inserted between the pixel data PD2 and PD3 as shown in Part (b) of FIG. 12. In this case, the subsequent pixel data PD3, PD4, ... must be delayed with respect to the read-out image data.

Since the CCD 11, which usually comprises a one-dimensional reading sensor, can be moved only at a constant speed, the prior art image processor requires provision of such a memory 15 as a RAM for storing at least one line of image data for speed conversion, as shown in FIG. 11.

FIG. 13 shows another prior art image processor which performs interpolating operation over input image data with respect to its line data to enlarge an original image in a vertical scanning direction. In this example, an output image signal of a CCD 21 when line scanning an original image for its reading is converted at an A-D converter 22 into n-bit digital image data, the image data is read out usually on every line basis, so that, when the reading of one line of the image data is completed, a scanner motor 25 is controlled under control of a scanner controller 24 to move the CCD 21 in the form of one-dimensional reading sensor by an amount corresponding to one line in a direction perpendicular to an original document. When it is desired to interpolate predetermined image data (line data) on every line basis for the purpose of enlarging the dimensions of the image in a vertical scanning direction, speed conversion becomes necessary. To this end, the n-bit image data as the output of the A-D converter 22 is once stored in a page memory 27, the image data is later read out from the page memory 27 under control of the scanner controller 24 and then sent to an interpolating circuit 26 to be subjected therein to an interpolating operation of inserting predetermined image data on every line basis. At this time, the line data to be inserted is determined by referring to the line data before and after that line data. For example, the line data of the previous line is used as interpolation line data as it is.

For example, in the case where it is desired to doubly enlarge the continual image data of lines L1, L2, L3, L4, ... as shown in FIG. 14 at the position of the line L2, when a line L2' having the same image data as, e.g., the line L2 is inserted into between the lines L2 and L3, the subsequent lines L3, L4, ... must be delayed with respect to the read-out image data.

When raster scanning is carried out by moving the one-dimensional reading sensor at a constant speed in a direction perpendicular to the original document, the subsequent lines L3, L4, ... cannot be delayed with respect to the read-out image data. To avoid this, such an arrangement is required that the page memory 27 for storing at least one page of the read-out image data is prepared so that the read-out image data is once stored in the page memory 27 for speed conversion.

As has been explained above, the prior art image processor has had such a problem that, when it is desired to obtain an image enlarged in the horizontal scanning direction (raster direction), the enlarging operation requires the interpolating operation of the image data and thus at least such a line memory as a random access memory (RAM) for the interpolating operation is required; whereas, when it is desired to obtain an image enlarged in the vertical scanning direction, the enlarging operation requires the interpolating operation of the image data and thus at least such a page memory for once storing at least one page of image data is required, which results in its complicated arrangement and control.

SUMMARY OF THE INVENTION

It is an object of the present invention to provide an inexpensive image processor which can eliminate the problem in the prior art, which can perform enlarging operation in a horizontal and/or vertical scanning direction(s) while eliminating the need for the provision of such a line memory as a RAM and/or a page memory, and thus which can be made simple in arrangement and control.

In order to attain the above object, in accordance with an aspect of the present invention, there is provided an image processor in which image data, which pixel data correspond to pixels and continually and sequentially appear at a predetermined rate, is input; the input image data is sampled at a sampling circuit at a rate faster than the above predetermined rate to form image data which is enlarged in a horizontal scanning direction and contains a plurality of continual pixel data with respect to an identical pixel; and the pixel data are decimated at a pixel decimating circuit at a predetermined rate from the image data enlarged in the horizontal scanning direction to reduce the output image data of the sampling circuit at the predetermined rate in the horizontal scanning direction to thereby form image data corresponding to enlargement of the original image with a desired magnification in the horizontal scanning direction.

That is, the input image data is sampled at a rate corresponding to P times the rate of the input image data and then subjected to a decimating/reducing operation with a magnification 1/Q to obtain image data having a desired magnification of P/Q. As a result, only the decimating/reducing operation enables execution of the enlarging operation in the horizontal scanning direction of the image without providing such a line memory as a RAM.

With such an arrangement, the line memory (such as a RAM), which would be necessary in the prior art, can be eliminated and the need for image enlarging clock and control can be removed. Therefore, since the image reading, enlarging and reducing operations can be realized with only a reducing circuit and its control means, the present invention can be made small in size and low in cost.

Further, in the present invention, a relative moving speed between an image and its image reader is set to be lower than an ordinary relative moving speed to form image data which is enlarged in the vertical scanning direction and which contains a plurality of continual line data each having a plurality of pixel data corresponding to pixels, and the line data of the formed image data is decimated at a line decimating circuit at a predetermined rate to thereby obtain image data having a desired magnification in the vertical scanning direction of the original image.

That is, in order to enlarge the dimensions of the image in the vertical scanning direction, the relative moving speed between the image and its reading sensor is set to be lower than the ordinary relative moving speed, the image is read at a constant slow rate to sample the same line P times and the image signal is subjected to a decimating operation of 1/Q on every line basis, with the result that the need for the page memory and its control, which would be necessary in the prior art, can be removed and only the decimating operation enables realization of the enlarging (reducing) operation.

In this way, since the read-out image can be enlarged and/or reduced with use of only a reducing circuit and its control circuit, the present invention can be made small in size and low in cost.

DESCRIPTION OF THE PREFERRED EMBODIMENTS

Embodiments of the present invention will be detailed with reference to the accompanying drawings.

Figure 1:
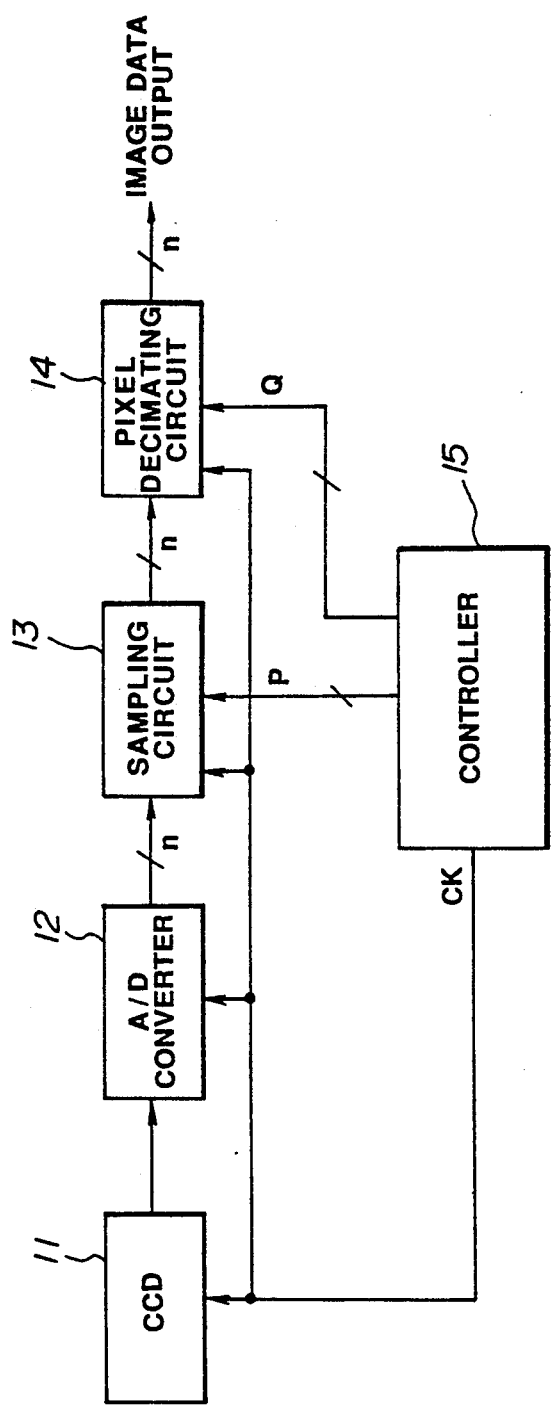
FIG. 1 is a block diagram of an image processor for executing enlarging operation over an image data in a horizontal scanning direction in accordance with an embodiment of the present invention.
Figure 11:
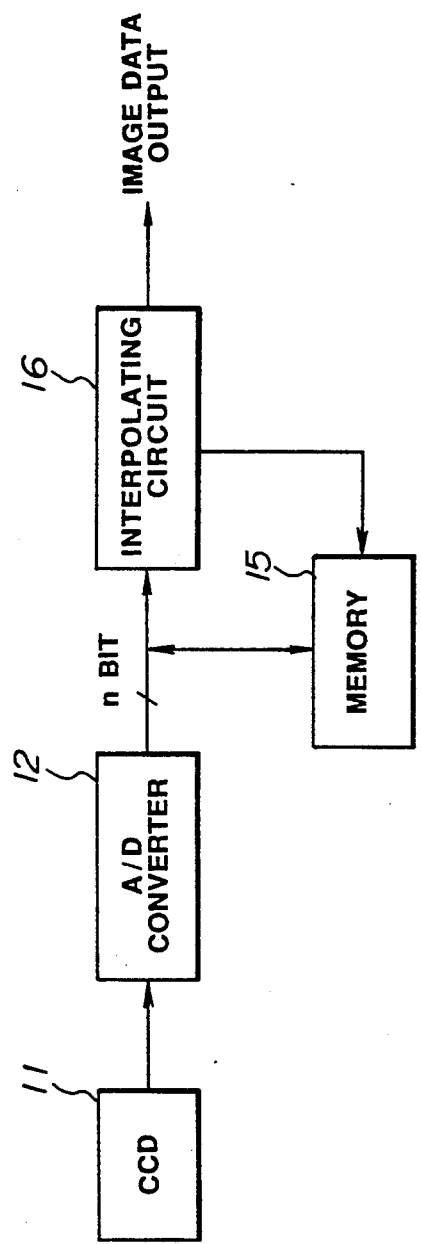
FIG. 11 is a block diagram of a prior art image processors for executing enlarging operation over an image data in a horizontal scanning direction.
Figure 12:
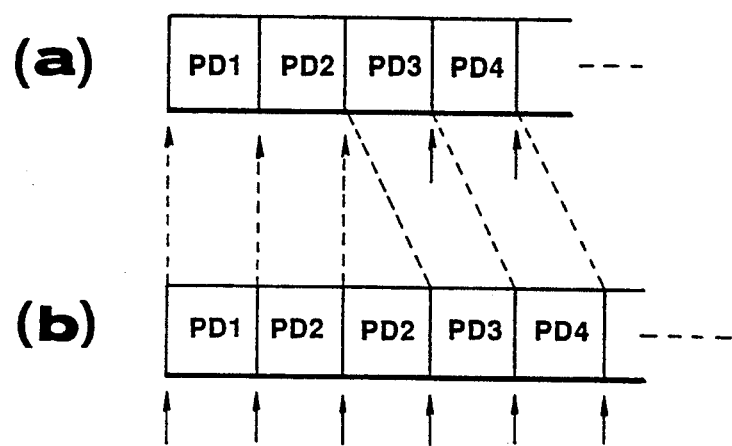
FIGS. 12A-12B are a timing chart for explaining the operation of the prior art of FIG. 11.

Referring first to FIG. 1, there is shown a block diagram of an image processor for executing enlarging operation over a read-out image signal in a horizontal scanning direction in accordance with an embodiment of the present invention, wherein parts having substantially the same functions as those in a prior art of FIG. 11 are denoted by the same reference numerals for the convenience of explanation.

The image processor of the present embodiment of FIG. 1 comprises a charge coupled device (CCD) 11 in the form of a one-dimensional reading sensor for raster scanning an image to read the image; an analog-digital (A-D) converter 12 for receiving an image signal read at the CCD 11 therefrom, converting the image signal into digital image data of n bits, and outputting the n-bit image; a sampling circuit 13 for sampling the output image data of the A-D converter 12 at a constant rate faster than the rate of the output image data of the A-D converter 12; a pixel decimating circuit 14 for decimating an output of the sampling circuit 13 at intervals of a predetermined time; and a controller 15 for controlling these circuits 11 to 14.

In the present embodiment, the A-D converter 12 may be followed by such an image correcting circuit as, e.g., a shading correcting circuit or an automatic gain correcting circuit, as necessary.

When it is desired for the image processor of the present embodiment to obtain image data enlarged with a magnification of P/Q, for example, in a horizontal scanning direction; an original image is raster scanned at the CCD 11 to obtain a read-out image signal, the read-out image signal is converted at the A-D converter 12 into n-bit digital image data, the n-bit digital image data is sampled at the sampling circuit 13 at a constant rate corresponding to P times the rate of the output image data of the A-D converter 12, and then the image data sampled at the sampling circuit 13 is decimated at the pixel decimating circuit 14 to 1/Q to obtain image data enlarged at a desired enlarging magnification of P/Q in the horizontal scanning direction.

As a result, the n-bit digital image data, which is enlarged with the magnification P/Q in the horizontal scanning direction, is output from the pixel decimating circuit 14 and subsequently supplied as $2^n$-gray-level image data to a predetermined device (not shown) to be processed thereat.

In the present embodiment, the CCD 11, A-D converter 12, sampling circuit 13 and pixel decimating circuit 14 are controlled by the controller 15, as already mentioned above.

Figure 2:
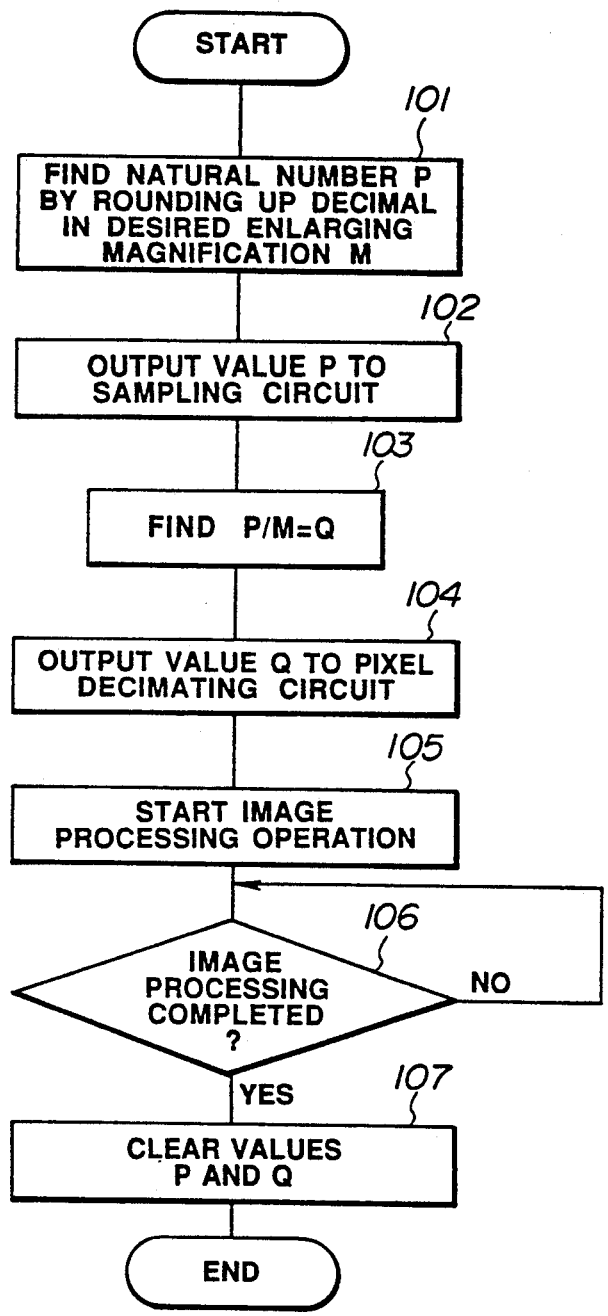
FIG. 2 is a flowchart for explaining an exemplary arrangement of a controller in FIG. 1.

Shown in FIG. 2 is a flowchart for explaining the operation of the controller 15. More specifically, prior to the image processing operation of the image processor, the controller 15 first rounds up a decimal in a desired enlarging magnification M in the horizontal scanning direction of the image processing of the image processor to find a natural number P (step 101) and outputs the natural number P to the sampling circuit 13 (step 102).

The controller then divides the value P by the value M (P/M=Q) to find a value Q (step 103) and outputs the value Q to the pixel decimating circuit 14 (step 104).

Subsequently, the controller drives the CCD 11, A-D converter 12, sampling circuit 13 and pixel decimating circuit 14 to start the image processing operation (step 105). When the image processing operation is completed (step 106), the controller clears the value P issued to the sampling circuit 13 and the value Q issued to the pixel decimating circuit 14 (step 107), thus terminating this processing.

The sampling circuit 13, on the basis of the value P received from the controller 15, controls the sampling rate of the image data received from the A-D converter 12; while the pixel decimating circuit 14, on the basis of the value Q received from the controller 15, controls the decimating rate of the image data received from the sampling circuit 13.

Figure 3:
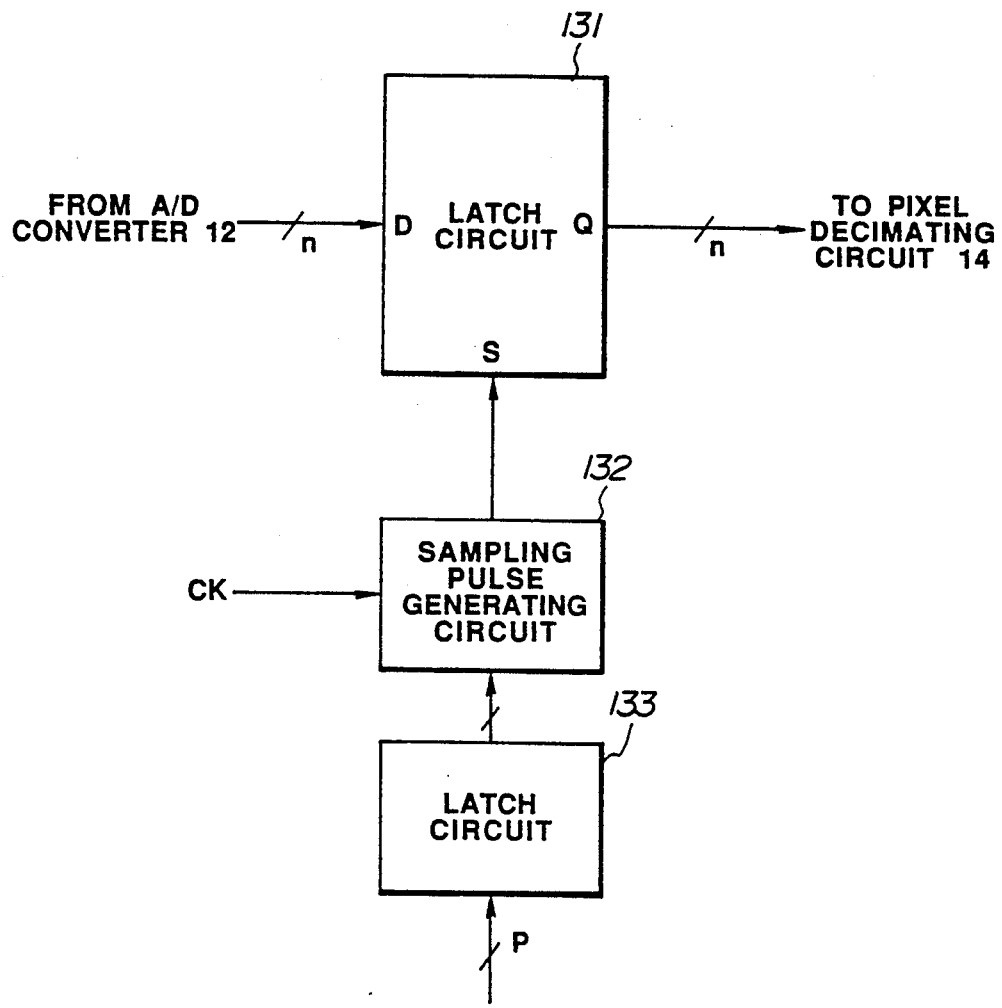
FIG. 3 is a block diagram of an exemplary arrangement of a sampling circuit in FIG. 1.

FIG. 3 shows an exemplary arrangement of the sampling circuit 13 which comprises a latch circuit 131, a sampling pulse generating circuit 132 and another latch circuit 133. In the sampling circuit 13 when receiving the value P from the controller 15, the latch circuit 133 latches the received value P and the sampling pulse generating circuit 132 generates a predetermined sampling pulse on the basis of a clock pulse CK received from the controller 15 and applies the sampling pulse to the latch circuit 131. In the illustrated example, the sampling pulse generating circuit 132 is arranged to generate the sampling pulse at a rate corresponding to P times the rate of the output image data of the A-D converter 12.

The latch circuit 131 receiving the n-bit image data from the A-D converter 12 samples, on the basis of the sampling pulse received from the sampling pulse generating circuit 132, the n-bit image data received from the A-D converter 12 at the rate corresponding to P times the rate of the output image data of the A-D converter 12. As a result, the latch circuit 131 outputs image data containing P of pixel data with respect to the same pixel to the pixel decimating circuit 14.

Figure 4:
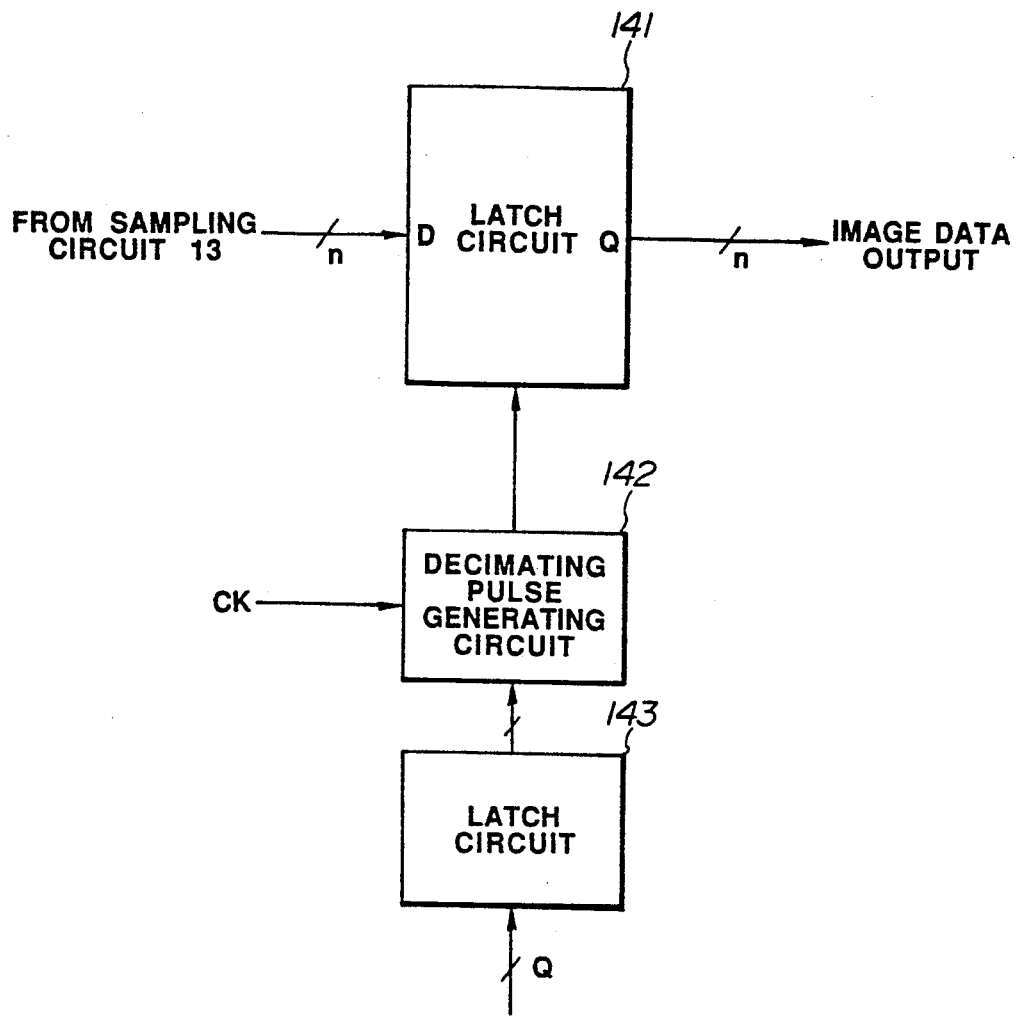
FIG. 4 is a block diagram of an exemplary arrangement of a pixel decimating circuit in FIG. 1.

Referring to FIG. 4, there is shown an exemplary arrangement of the pixel decimating circuit 14 which comprises a latch circuit 141, a decimating pulse generator circuit 142 and another latch circuit 143. In the pixel decimating circuit 14 when receiving the value Q from the controller 15, the latch circuit 143 latches the value Q and the decimating pulse generator circuit 142 generates a predetermined decimating pulse on the basis of the value Q and the clock pulse CK received from the controller 15 and sends the decimating pulse to the latch circuit 141. In the illustrated example, the decimating pulse generator circuit 142 generates the decimating pulse corresponding to the sampling pulse of the sampling pulse generating circuit 132 of the sampling circuit 13 decimated at a rate of 1/Q. The decimating pulse generator circuit 142 may comprise a known rate multiplier.

The latch circuit 141 receives the n-bit image data containing P of pixel data with respect to the same pixel from the sampling circuit 13. The latch circuit 141 decimates to 1/Q the received n-bit image data on the basis of the decimating pulse received from the decimating pulse generator circuit 142. The image data decimated to 1/Q is output from the latch circuit 141 as n-bit digital image data enlarged with the magnification P/Q in the horizontal scanning direction.

Explanation will next be made as to the specific operation of the present embodiment by referring to a timing chart of FIG. 5.

Figure 5:
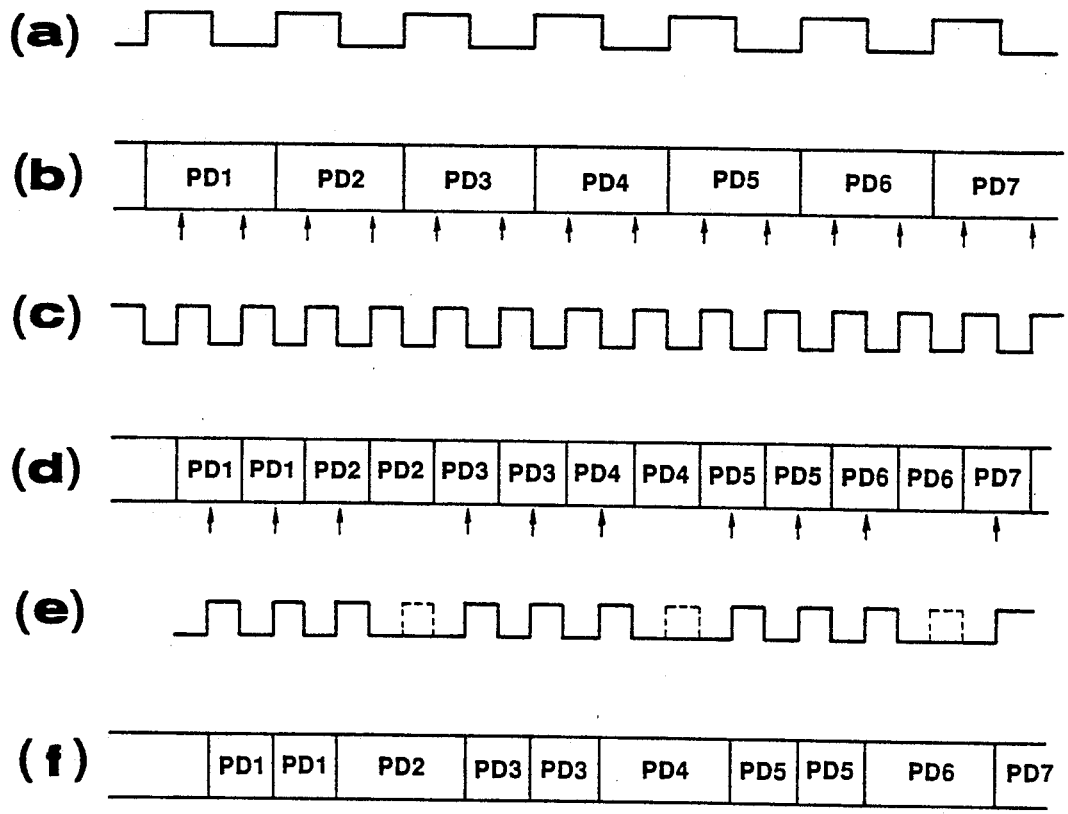
FIGS. 5A-5F are a timing chart for explaining the operation of the embodiment of FIG. 1.

FIG. 5 shows the timing chart when an original image is raster scanned to obtain image data eventually enlarged with a magnification of 1.5 in the horizontal scanning direction. In more detail, Part (a) of FIG. 5 shows a clock signal applied to the A-D converter 12, Part (b) of FIG. 5 shows image data issued from the A-D converter 12, Part (c) of FIG. 5 shows a sampling pulse generated from the sampling pulse generating circuit 132, Part (d) of FIG. 5 shows image data issued from the sampling circuit 13, Part (e) of FIG. 5 shows a decimating pulse generated from the decimating pulse generator circuit 142, and Part (f) of FIG. 5 shows image data generated from the pixel decimating circuit 14.

When it is desired to obtain final image data having a magnification of 1.5 in the horizontal scanning direction, the value P of the controller 15 is set to be a natural number corresponding to the magnification 1.5 but its decimal rounded up, that is, to be 2; while the value Q of the controller is set to be a positive real number satisfying the magnification P/Q of 1.5, that is, in this case, to be 4/3.

Assume now that an image signal read out at the CCD 11 is sequentially converted at the A-D converter 12 into n-bit digital pixel data PD1, PD2, PD3, PD4, PD5, PD6, . . . Then, the A-D converter 12 outputs such image data containing n-bit pixel data PD1, PD2, PD3, PD4, PD5, PD6, . . . arranged at a constant A-D conversion period (refer to Part (a) of FIG. 5 of the A-D converter 12 as shown in Part (b) of FIG. 5.

The n-bit pixel data PD1, PD2, PD3, PD4, PD5, PD6, . . . are sampled at the sampling circuit 13 at a rate corresponding to twice the A-D conversion rate of the A-D converter 12, so that the sampling circuit 13 outputs such n-bit pixel data containing pixel data PD1, PD1, PD2, PD2, PD3, PD3, PD4, PD4, PD5, PD5, PD6, PD6, . . . , that is, image data doubly magnified in the horizontal scanning direction as shown in Part (d) of FIG. 5.

The doubly enlarged image data is decimated at the pixel decimating circuit 14 to 1/Q (=$\frac{2}{3}$). That is, the pixel decimating circuit 14 eventually outputs pixel data containing pixel data PD1, PD1, PD2, PD3, PD3, PD4, PD5, PD5, PD6 . . . arranged as shown in Part (f) of FIG. 5, that is, image data enlarged with a magnification of 1.5 in the horizontal scanning direction (in the raster direction) of the original image.

Meanwhile, when it is desired to obtain an image enlarged with a magnification of 3.6 in the horizontal scanning direction (raster direction), the value P is set to be 4 and the value Q is set to be 10/9 and similar processing to the above is carried out. Although the above explanation has been made in connection with the enlarging operation, it goes without saying that, when the value P is set to be 1 and processing is carried out under a condition that a relation P <Q is satisfied, a reduced image can be obtained.

Though explanation has been made in connection with the enlarging operation only in the horizontal scanning direction (raster direction) in the foregoing embodiment, such enlarging operation as in the vertical scanning direction, that is, a direction perpendicular to the raster direction may be carried out based on a known method such as an inter-line interpolation method.

Figure 6:
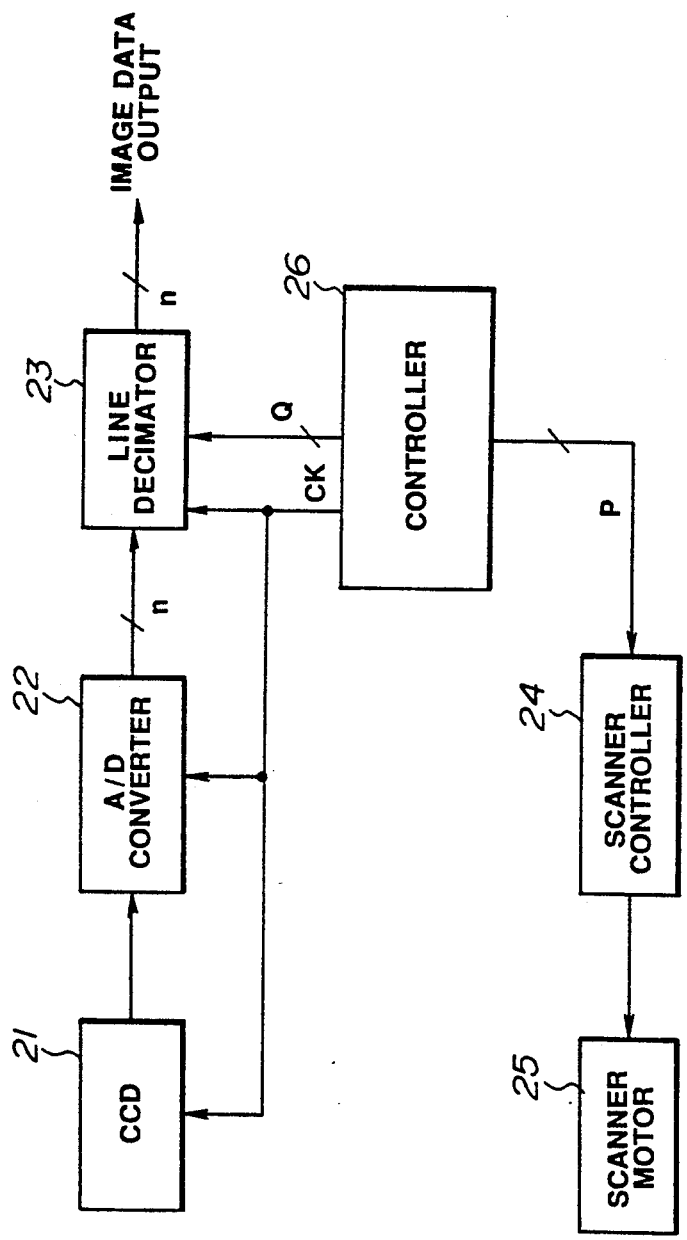
FIG. 6 is a block diagram of an image processor for executing enlarging operation over an image data in a vertical scanning direction in accordance with an embodiment of the present invention.
Figure 13:
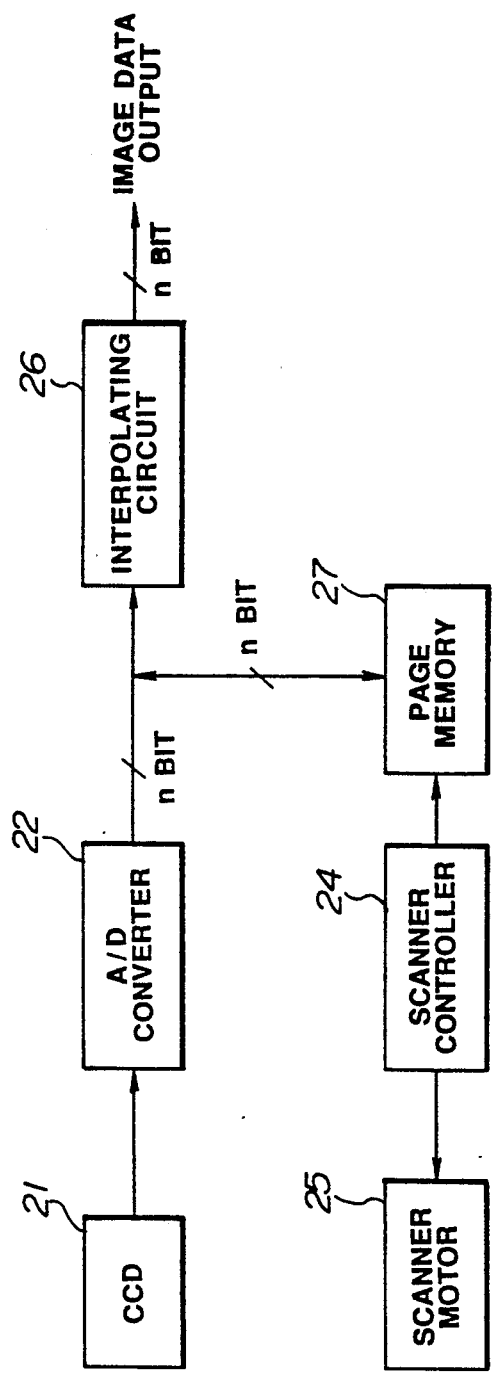
FIG. 13 a block diagram of a prior art image processors for executing enlarging operation over image data in a vertical scanning direction.
Figure 14:
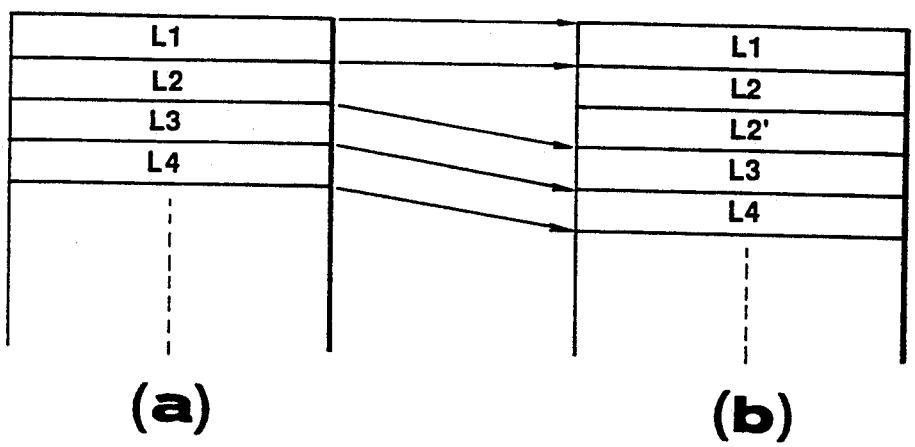
FIGS. 14A-14B are a timing chart for explaining the operation of the prior art of FIG. 13.

FIG. 6 shows a block diagram of an image processor for executing enlarging operation of image data in a vertical scanning direction in accordance with an embodiment of the present invention. In FIG. 6, parts having substantially the same functions as those in the prior art of FIG. 13 are denoted by the same reference numerals for convenience of explanation.

In FIG. 6, the illustrated image processor of the present embodiment comprises a CCD 21 in the form of a one-dimensional reading sensor for raster scanning an image to read it; an A-D converter 22 for receiving an image signal read out at the CCD 21 therefrom, converting the received image signal into n-bit digital image data; a scanner motor 25 for relatively moving the CCD 21 relative to the image; a scanner controller 24 for controlling the scanner motor 25; a line decimating circuit 23 for subjecting the n-bit digital image data as an output of the A-D converter 22 to a decimating operation on every line basis; and a controller 26 for controlling these circuits 21 to 25.

In this embodiment, the A-D converter 22 may be followed by such an image correcting circuit as, e.g., a shading correcting circuit or an automatic gain correcting circuit, as necessary.

With the image processor of the present embodiment, when it is desired to obtain image data enlarged with a magnification of P/Q in the vertical scanning direction for example, the scanner controller 24 controls the scanner motor 25 to cause the CCD 21 to raster scan an original image to read the same line P times repetitively. The image thus read at the CCD 21 is converted at the A-D converter 22 into n-bit digital image data containing P lines which are all the same. The n-bit image data is then decimated and reduced at the line decimating circuit 23 at a magnification of 1/Q on every line basis.

As a result, the n-bit digital image data, which is enlarged with the magnification P/Q in the vertical scanning direction, is output from the line decimating circuit 23 and subsequently supplied as $2^n$-gray-level image data to a predetermined device (not shown) to be processed thereat.

Figure 7:
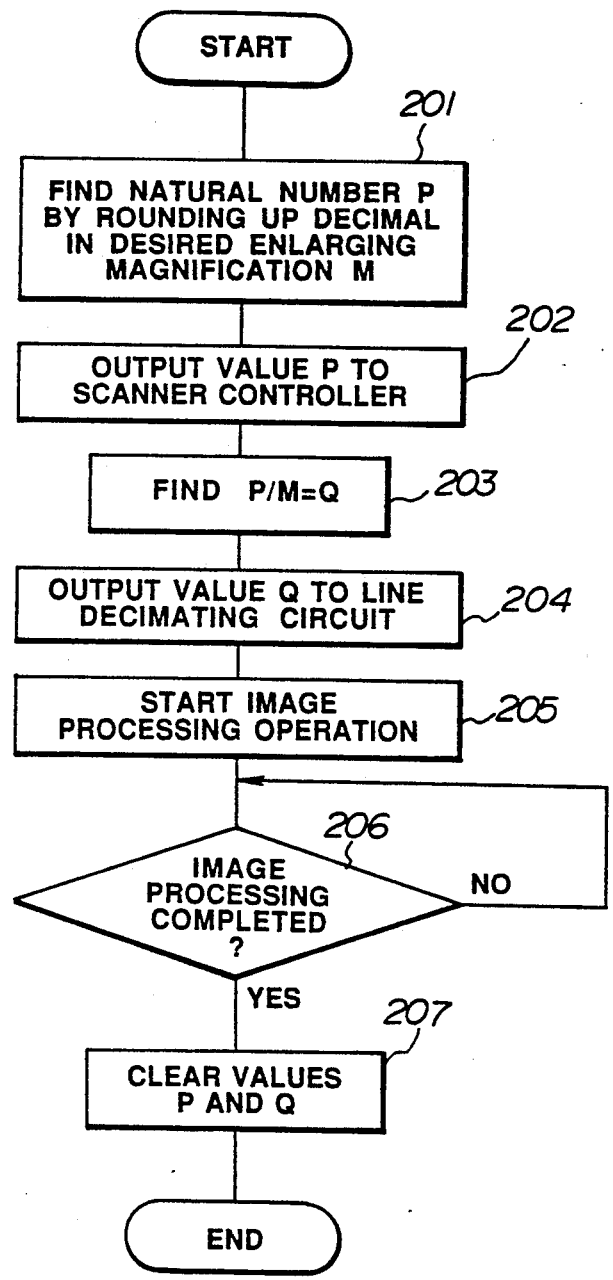
FIG. 7 is a flowchart for explaining the operation of a controller in FIG. 6.

Shown in FIG. 7 is a flowchart for explaining the operation of the controller 26. More specifically, prior to the image processing operation of the image processor, the controller 26 first rounds up a decimal in a desired enlarging magnification M in the horizontal scanning direction of the image processing of the image processor to find a natural number P (step 201) and outputs the natural number P to the scanner controller 24 (step 202).

The controller 26 then divides the value P by the value M (P/M=Q) to find a value Q (step 203) and outputs the value Q to the line decimating circuit 23 (step 204).

Subsequently, the controller drives the CCD 21, A-D converter 22, line decimating circuit 23 and scanner controller 24 to start the image processing operation (step 205). When the image processing operation is completed (step 206), the controller clears the value P issued to the scanner controller 24 and the value Q issued to the line decimating circuit 23 (step 207), thus terminating this processing.

The scanner controller 24, on the basis of the value P received from the controller 26, controls the scanner motor 25; while the line decimating circuit 23, on the basis of the value Q received from the controller 26, controls the decimating rate of the output image data of the A-D converter 22.

Figure 8:
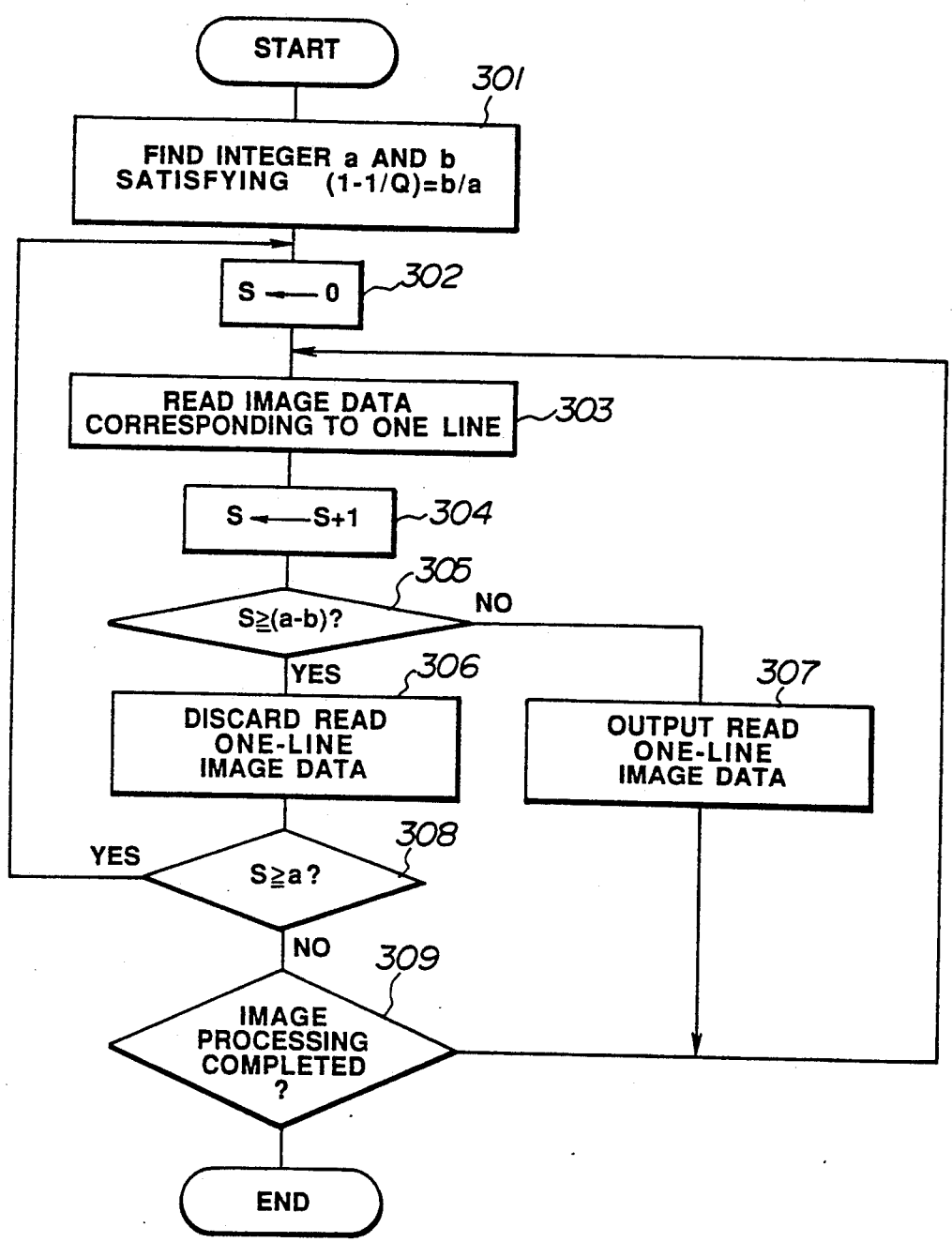
FIG. 8 is a flowchart for explaining the line decimating operation in the embodiment of FIG. 6.

FIG. 8 shows a flowchart for explaining the operation of the line decimating circuit 23. The line decimating circuit 23, when receiving the value Q from the controller 26, calculates an equation (1−1/Q) to find integers a and b satisfying an equation (1−1/Q)=b/a (step 301). And the line decimating circuit 23 clears the value S to 0 (step 302), receives the image data corresponding to one line from the A-D converter 22 (step 303), increments the value S by 1 (step 304), and judges whether or not a relation $S \geq (a-b)$ is satisfied (step 305). Determination of a non-satisfaction of the relation causes the line decimating circuit 23 to output the one-line image data (step 307) and to return to the step 303 to receive the next image data corresponding to one line from the A-D converter 22. Such operation is repeated. The determination of a satisfaction of the relation $S \geq (a-b)$ causes the line decimating circuit 23 to discard the then received one-line image data (step 306) and then to judge whether a relation S≧ a is satisfied (step 308). The determination of a non-satisfaction of the relation S≧ a causes the line decimating circuit 23 to determine whether or not its image processing operation, i.e., its page image processing operation is completed (step 309). Determination of the completion of the image processing operation causes the line decimating circuit 23 to return to the step 303. That is, the line decimating circuit 23 receives the next image data of one line from the A-D converter 22 and repetitively discards the received one-line image data until the relation S≧ a is satisfied at the step 308. When the relation S≧ a is satisfied at the step 308, the line decimating circuit 23 returns to the step 303 where the value S is cleared to 0 and the same operation as explained above is repeated. And when determining the end of the image processing operation at the step 309, the line decimating circuit 23 terminates the line decimating operation.

Figure 9:
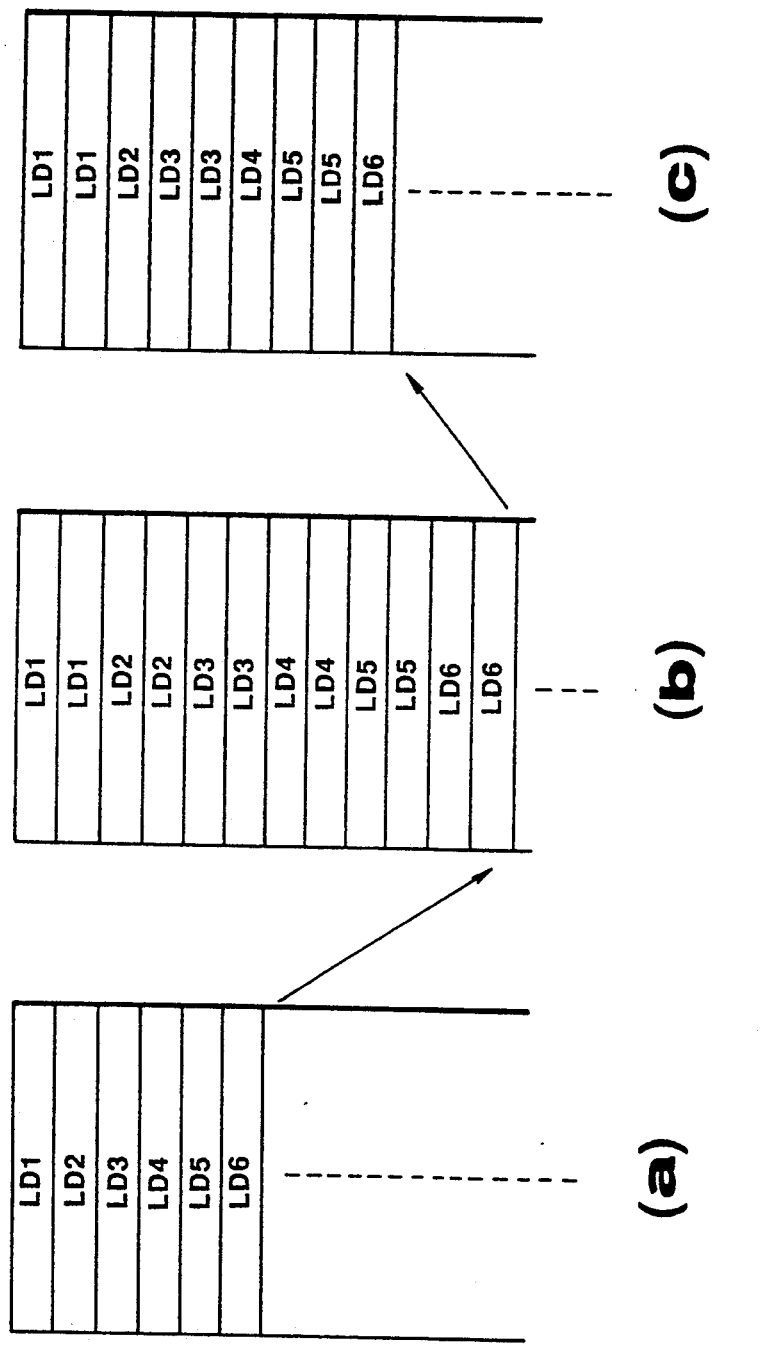
FIGS. 9A-9C are a timing chart for explaining the operation of the embodiment of FIG. 6.

Explanation will then be made as to the operation of the present embodiment by referring to a timing chart of FIG. 9.

FIG. 9 shows in the case where an original image is raster scanned to obtain final image data having a magnification of 1.5 in the vertical scanning direction.

When it is desired to obtain final image data having a magnification of 1.5 in the vertical scanning direction, the value P of the controller 15 is set to be a natural number corresponding to the magnification 1.5 but its decimal rounded up, that is, to be 2; while the value Q of the controller is set to be a positive real number satisfying the magnification P/Q of 1.5, that is, in this case, to be 4/3.

In more detail, Part (a) of FIG. 9 shows output image data of the A-D converter 22 when the scanner motor 15 is moved at an ordinary speed, Part (b) of FIG. 9 shows output image data of the A-D converter 22 when the scanner motor 15 is moved at a speed corresponding to ½ times the ordinary speed and when the same line is read twice repetitively through the CCD 21, and Part (c) of FIG. 9 shows output image data of the line decimating circuit 23.

Assuming now that the image signal read through the CCD 21 is converted at the A-D converter 22 into digital data LD1, LD2, LD3, LD4, LD5, LD6, . . . of respective lines, then the A-D converter 22 outputs such data arranged as shown in Part (a) of FIG. 9 at the ordinary reading speed.

Next, when a relative moving speed between an image and its reading sensor is set to be lower than an ordinary relative moving speed and the image is read at the slow speed with the same line read twice repetitively, the A-D converter 22 outputs such data that comprises line data LD1, LD1, LD2, LD2, LD3, LD3, LD4, LD4, LD5, LD5, LD6, LD6, . . . arranged as shown in Part (b) of FIG. 9, that is, the image data enlarged twice in the vertical scanning direction.

When such an output of the A-D converter 22 as shown in Part (b) of FIG. 9 is decimated through the line decimating circuit 23 on every line basis with 1/Q=¾, the line decimating circuit 23 outputs such data that comprises line data LD1, LD1, LD2, LD3, LD3, LD4, LD5, LD5, LD6, . . . arranged as shown in Part (c) of FIG. 9, that is, the final image data having a magnification of 1.5 in the vertical scanning direction.

When it is desired to obtain an image having a magnification of 3.6 in the vertical scanning direction for example, it is only required to set the value P at 4 and the value Q at 10/9 to perform such operation as mentioned above. Although the above explanation has been made in connection with the enlarging operation, it goes without saying that, when the value P is set to be 1 or when such operation as to satisfy a relation P< Q is carried out, a resultant reduced image can be obtained. Further, the enlarged image result may be of course subjected to a suitable image smoothing operation.

The above explanation has been made in connection with the example where the image is read by moving the one-dimensional reading sensor at the constant speed in the direction perpendicular to the original document, such an arrangement may be similarly employed that the original document to be read is moved at the constant speed in the direction perpendicular to the one-dimensional reading sensor, as a matter of course.

In the foregoing embodiments, explanation has been made in connection with only the enlarging operation in the vertical scanning direction and in the direction perpendicular to the raster direction. However, the enlarging operation in the horizontal scanning direction, i.e., in the raster direction may be carried out by a known method such as an inter-pixel interpolation method.

Further, the enlarging operation of the horizontal scanning or raster direction in the arrangement of FIG. 6 may be realized with use of the arrangement of FIG. 1.

Figure 10:
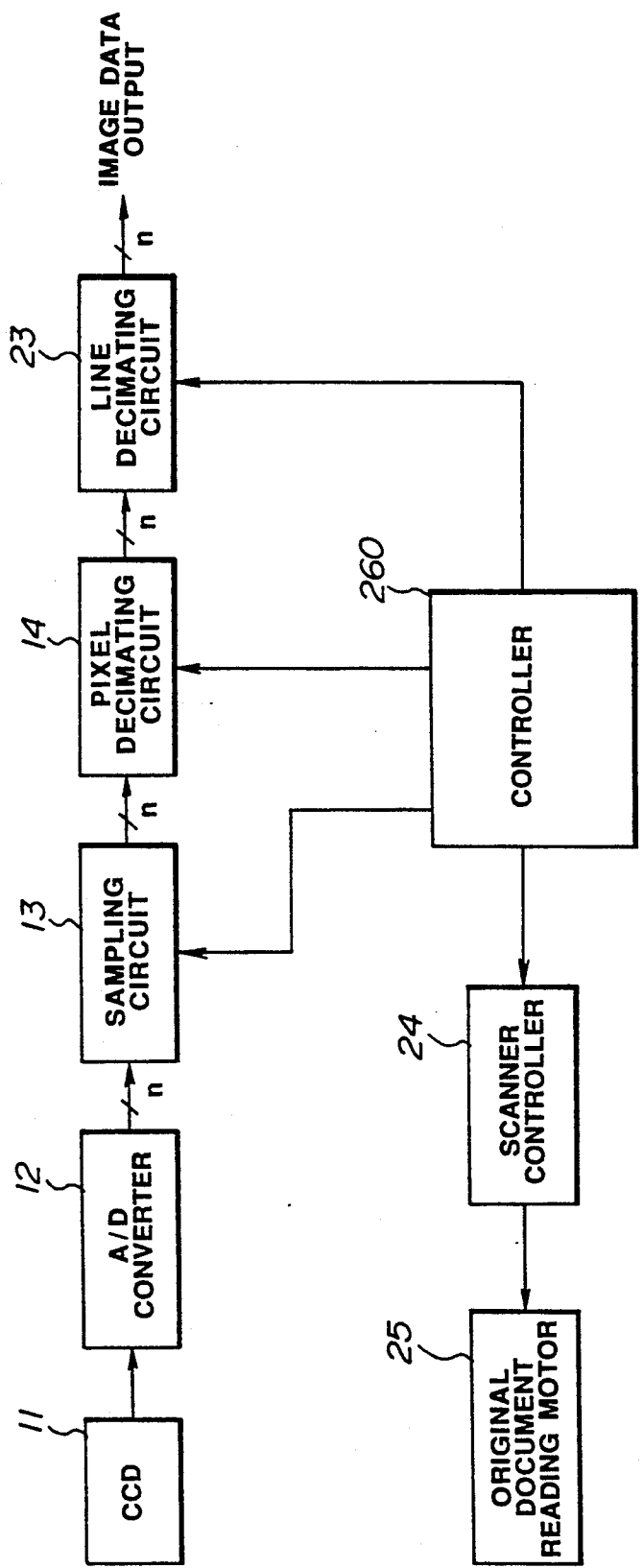
FIG. 10 is a block diagram of an image processor for executing enlarging operation over an image data in the horizontal and vertical scanning directions in accordance with an embodiment of the present invention.

Such latter arrangement is shown in FIG. 10 as yet another embodiment of the present invention, in which case the line decimating circuit 23 shown in FIG. 6 is connected to the output of the pixel decimating circuit 14 shown in FIG. 1. In this case, a controller 260 shown in FIG. 10 has the functions of both the controller 15 in FIG. 1 and the controller 26 in FIG. 6.

More specifically, in the case of the present embodiment, when it is desired to obtain image data enlarged with a magnification of P/Q in the horizontal and vertical scanning directions for example, the original-document reading motor 25 is controlled under the scanner controller 24 to cause the CCD 11 to raster scan and to repetitively read the same line P times. An image signal thus read out by the CCD 11 is converted at the A-D converter 12 into n-bit digital image data containing P lines which are all the same. The n-bit image data is sampled at the sampling circuit 13 at a constant speed corresponding to P times of the conversion speed of the A-D converter 12 to obtain sampled image data. The sampled image data signal is decimated at the pixel decimating circuit 14 with a magnification of 1/Q to obtain image data having a desired magnification of P/Q in the horizontal scanning direction.

Next, the image data is decimated and reduced at the line decimating circuit 23 with a magnification of 1/Q on every line basis.

As a result, the line decimating circuit 23 outputs n-bit digital image data enlarged with the magnification P/Q in the horizontal and vertical scanning directions. And the digital image data is supplied as $2^n$-gray-level image data from the line decimating circuit 23 to a predetermined device (not shown) to be suitably processed.

What is claimed is:
1. An image processor comprising:
   image data input means for inputting image data which correspond to pixels and continually and sequentially appear at a predetermined rate;

image data sampling means for sampling the image data inputted through said image data input means at a rate faster than said predetermined rate to form image data which is enlarged in a horizontal scanning direction and contains a plurality of continual pixel data with respect to an identical pixel; and pixel data decimating means for decimating said pixel data at a predetermined rate from the image data sampled through said image data sampling means to reduce the output image data of said pixel data sampling means at said predetermined rate in the horizontal scanning direction to thereby form image data corresponding to enlargement of the input image data of said image data input means with a desired magnification in the horizontal scanning direction.

2. An image processor as set forth in claim 1, wherein said image data sampling means samples the image data inputted through said image data input means at a rate corresponding to P times a rate of the input image data of said image data input means to form image data which is enlarged in the horizontal scanning direction and contains P of continual pixel data with respect to the same pixel, and said pixel data decimating means decimates the pixel data sampled by said pixel data sampling means to 1/Q so as to enlarge the input image data of said image data input means with a magnification of P/Q in the horizontal scanning direction.

3. An image processor as set forth in claim 2, wherein said image data sampling means includes sampling pulse generating means for generating a sampling pulse at a rate corresponding to P times the rate of the input image data of said image data input means and output means for samplingly outputting the input image data of said image data input means on the basis of said sampling pulse generated by said sampling pulse generating means.

4. An image processor as set forth in claim 3, wherein said pixel data decimating means includes decimating-pulse generating means for decimating the sampling pulse generated by said sampling pulse generating means to 1/Q to generate a decimating pulse, and means for sampling the output image data of said pixel data sampling means based on said decimating pulse generated by said decimating-pulse generating means to decimate the pixel data sampled by said pixel data sampling means to 1/Q so as to enlarge the input image data of said image data input means with the magnification of P/Q.

5. An image processor as set forth in claim 4, wherein said decimating-pulse generating means comprises a rate multiplier.

6. An image processor as set forth in claim 1, wherein said image data input means includes image reading means for raster scanning an image to output an image signal on every line basis, and analog-digital converting means for converting the image signal issued from said image reading means on every line basis into digital image data to output the digital image data which pixel data for each pixel appear continually and sequentially at a predetermined period.

7. An image processor as set forth in claim 2, further comprising control means for finding a natural number P by rounding up a decimal in a desired magnification M, for determining a sampling pulse rate of said image data sampling means on the basis of said value P, and for determining a decimating rate of said pixel data decimating means on the basis of a reciprocal 1/Q obtained by dividing the value P by a value M.

8. An image processor comprising:

image data forming means for forming image data which is enlarged in a vertical scanning direction and which contains a plurality of continual line data with respect to an identical line, each of said line data containing a plurality of pixel data associated with pixels; and line data decimating means for decimating the line data of the image data formed by said image data forming means at a predetermined rate to reduce the image data formed by said image data forming means at said predetermined rate and thereby to form image data which is enlarged with a desired magnification in a vertical scanning direction.

9. An image processor as set forth in claim 8, wherein said image data forming means includes:

image reading means for raster scanning an image to output an image signal on every line basis;

movement control means for relatively moving said image reading means at a speed slower than a predetermined speed relative to said image to continually output a plurality of the image signals corresponding to an identical line from said image reading means; and analog-digital converting means for converting the image signal issued from said image reading means on every line basis into digital image data to output the digital image data which is enlarged in the vertical scanning direction and which contains a plurality of continual line data with respect to an identical line.

10. An image processor as set forth in claim 9, further comprising control means for finding a natural number P by rounding up a decimal in a desired magnification M, for determining a relative movement speed of said image reading means to said image by said movement control means on the basis of said value P, and for determining a decimating rate of said line data decimating means on the basis of a reciprocal 1/Q obtained by dividing the value P by a value M.

11. An image processor as set forth in claim 10, wherein said line data decimating means finds integers a and b satisfying a relation $(1-1/Q)=b/a$ and decimates the line data on b of lines each time the number of lines for the line data of the input image data of said image data forming means becomes a.

12. An image processor comprising:

image data forming means for forming image data which contains a plurality of continual line data with respect to an identical line, each of said line data containing a plurality of pixel data associated with pixels;

image data sampling means for sampling the input image data of said image data forming means at a predetermined rate to form image data which contains a plurality of continual pixel data with respect to an identical pixel and which contains a plurality of continual line data with respect to the identical line;

pixel data decimating means for decimating said pixel data from the image data sampled by said image data sampling means at a predetermined rate; and line data decimating means for decimating line data from the image data decimated by said pixel data decimating means at a predetermined rate.

13. An image processor as set forth in claim 12, wherein said image data forming means includes image reading means for raster scanning an image to output an image signal on every line basis, movement control means for relatively moving said image reading means at a speed slower than a predetermined speed relative to said image to continually output a plurality of image signals corresponding to an identical line from said image reading means, and analog-digital converting means for converting the image signal issued from said image reading means on every line basis into digital image data to output digital image data which is enlarged in the vertical scanning direction and which contains a plurality of continual line data with respect to an identical line.

* * * * *

UNITED STATES PATENT AND TRADEMARK OFFICE
CERTIFICATE OF CORRECTION

PATENT NO. : 5,280,365
DATED : January 18, 1994
INVENTOR(S) : Toshihiko Nannichi et al.

It is certified that error appears in the above-indentified patent and that said Letters Patent is hereby corrected as shown below:

Item [57],
Abstract, Title page, line 5, change "1/Q" to --1/Q--.

Signed and Sealed this

Twentieth Day of September, 1994

Attest:

Attesting Officer

BRUCE LEHMAN

Commissioner of Patents and Trademarks